Gordon H. Lovett
INVENTOR.

BY

ATTORNEY

Gordon H. Lovett
INVENTOR.

United States Patent Office 3,399,120
Patented Aug. 27, 1968

3,399,120
PURIFICATION OF OLEFINICALLY UNSATURATED NITRILES BY WATER EXTRACTIVE DISTILLATION
Gordon H. Lovett, Texas City, Tex., assignor to Monsanto Company, St. Louis, Mo., a corporation of Delaware
Filed Dec. 9, 1965, Ser. No. 512,651
7 Claims. (Cl. 203—84)

ABSTRACT OF THE DISCLOSURE

A process and an apparatus for purifying crude olefinically unsaturated nitriles by extractively distilling the crude nitrile in the presence of water by means of which process and apparatus rich solvent water from the extractive distillation zone is introduced into a stripping zone where the water is recovered for reuse in the extractive distillation and from which stripping zone vapors are removed above the midpoint thereof and returned to the lower portion of the extractive distillation zone as a means of supplying heat to said extractive distillation zone.

---

Figure 1:
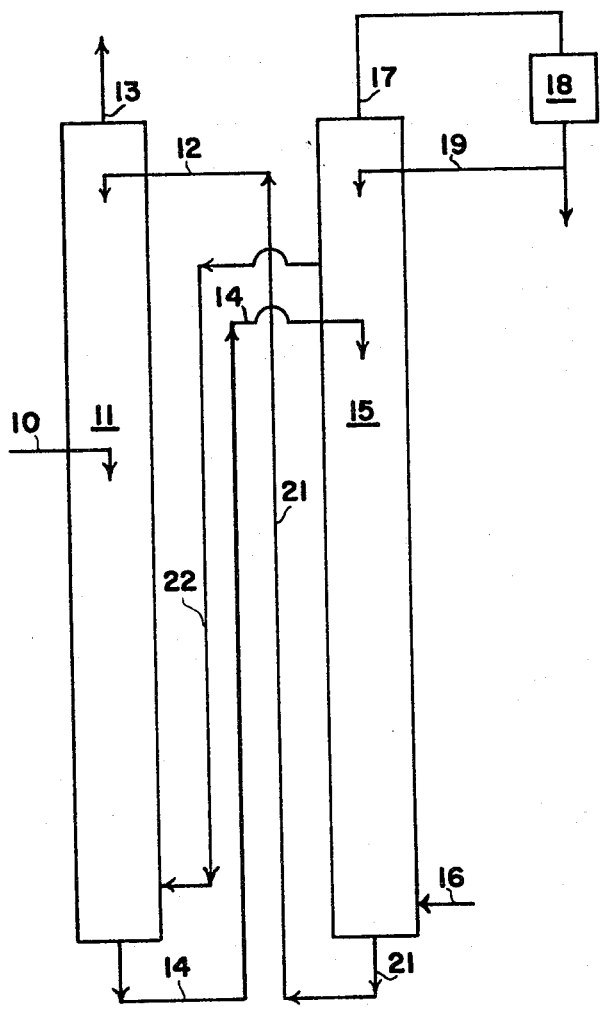

The present invention relates to the purification of olefinically unsaturated nitriles. More particularly, the present invention relates to a process for the purification of olefinically unsaturated nitriles by extractive distillation in the presence of water as the solvent.

One of the more advantageous methods of producing olefinically unsaturated nitriles is by the catalytic reaction of ammonia and an olefin. For example, acrylonitrile and methacrylonitrile may be readily produced by reaction of ammonia with propylene and isobutylene, respectively. In such production of the olefinically unsaturated nitriles, significant amounts of impurities such as closely related saturated nitriles and carbonyl compounds are formed as by-products. For instance, the production of acrylonitrile from ammonia and propylene results in formation of significant quantities of acetonitrile, propionitrile, acetone and the like. Generally, it is necessary to remove these by-product impurities from the unsaturated nitrile in order to qualify the unsaturated nitrile for polymerization to useful polymeric products.

One of the commonly used methods of removing by-product impurities, particularly those that are water-miscible, from olefinically unsaturated nitrile streams is that of extractive distillation of the impure unsaturated nitrile stream with water as the solvent. Such extractive distillation results in recovery of the unsaturated nitrile purified of the water-miscible by-product impurities as an overhead product and recovery of a rich solvent water containing the water-miscible by-product impurities as a bottoms product. Generally, in such extractive distillation methods, large quantities of solvent water are required to remove even small amounts of water-miscible by-product from an impure unsaturated nitrile stream. As a result of the large quantities of water required and the disposal problem created by the rich solvent water bottoms product of the extractive distillation, it is usually desirable and often necessary, to recover and re-use the solvent water in the extractive distillation over and over through many cycles.

In order to recover and re-use the solvent water in the extractive distillation process, it is necessary, of course, to have a means of purifying rich solvent water of the water-miscible impurities absorbed therein. Such purification means generally is a stripping column wherein rich solvent water is stripped of the water-miscible impurities contained therein and from which clean water is returned to the extractive distillation zone. In order to strip the water-miscible impurities from the rich solvent water, it is necessary to supply considerable heat to the stripping column, generally as much or more heat than that supplied to the extractive distillation column being required. Such relatively high heat requirements to both the extractive distillation column and the stripping column results in a rather large increase in the expense of purification of impure olefinically unsaturated nitriles by extractive distillation with water.

It is an object of the present invention to provide a new and improved process for the purification of olefinically unsaturated nitriles by extractive distillation in the presence of water as the solvent. Another object of the present invention is to provide a new and improved process for the purification of olefinically unsaturated nitriles by extractive distillation in the presence of water wherein the solvent water from the extractive distillation is recovered and re-used in said extractive distillation. It is particularly an object of the present invention to provide a new and improved process for the purification of olefinically unsaturated nitriles by extractive distillation with water and the recovery and re-use of the solvent water wherein the total input to the process is substantially reduced. Another particular object of the present invention is to provide a new and improved process for the removal of impurities such as acetonitrile and/or propionitrile and/or acetone from crude acrylonitrile by extractive distillation in the presence of water wherein the water is recovered and recycled to the extractive distillation and wherein the total heat input to said process is substantially reduced. It is also an object of the present invention to provide an apparatus for accomplishing the foregoing objects. Additional objects will become apparent from the following description of the invention herein disclosed.

The present invention which fulfills these and other objects comprises in one embodiment, a process for purifying crude olefinically unsaturated nitriles by extractive distillation in the presence of water with the subsequent recovery and re-use of said water in said extractive distillation process, said process comprising continuously introducing a crude olefinically unsaturated nitrile containing water-miscible impurities into an extractive distillation zone of at least 50 trays, said crude nitrile being introduced at a point intermediate the ends of said extractive distillation zone, continuously introducing solvent water into said extractive distillation zone above the point at which said crude nitrile is introduced, continuously withdrawing rich solvent water from the bottom of said extractive distillation zone, said rich solvent water containing said water-miscible impurities, continuously introducing said rich solvent water into a solvent stripping zone of at least 25 trays at a point above the midpoint of said solvent stripping zone, continuously introducing heat into said solvent stripping zone near the bottom of said zone in an amount in excess of at least 5 percent over that normally required to affect separation of said water-miscible impurities from said water, continuously withdrawing lean solvent water from the bottom of said solvent stripping zone, continuously returning said lean solvent water to said extractive distillation zone as solvent water, continuously withdrawing a portion of the vapors comprising water and said water-miscible impurities from within said solvent stripping zone at a point above the point at which said rich solvent water is introduced into said solvent stripping zone but below the top of said solvent stripping zone, continuously introducing said vapors into said extractive distillation zone at a point below the point at which said crude nitrile is introduced, continuously recovering olefinically unsaturated nitrile substantially purified of said water-miscible impurities from the top of said extractive distillation zone and continuously recovering water and said water-miscible impurities from the top of said solvent stripping zone, the concentration of said water-miscible impurities in the overhead being substantially greater than in said rich solvent water.

In another embodiment the present invention is an apparatus particularly suited for purifying olefinically unsaturated nitriles by extractive distillation in the presence of water with the subsequent recovery and re-use of said water in said extractive distillation process. This apparatus comprises:

(A) A first distillation column of at least 50 trays, (B) A second distillation column of at least 25 trays, (C) Feed inlet means in open communication with said first distillation column at a point intermediate the ends of said first distillation column, said inlet means also in open communication with the source of an impure olefinically unsaturated nitrile feed, (D) A first outlet means at the top of said first distillation column for removing overhead distillate from said first distillation column, (E) A second outlet means at the bottom of said first distillation column, said second outlet means being in open communication with said second distillation column at a point above the mid-point of said second distillation column, (F) A first outlet means from said second distillation column at the bottom of said second distillation column, said first outlet means in open communication with said feed first distillation column at a point above said inlet means of said first distillation column, (G) A second outlet means from said second distillation column located at a point above that at which said second outlet means from said first distillation column is in open communication with said second distillation column, said second outlet means from said second distillation column being in open communication with said first distillation column at a point below said feed inlet means of said first distillation column, (H) A third outlet means from said second distillation column at the top of said second distillation column for removing overhead distillate from said second distillation column, and (I) Means for introducing heat into said second distillation column at a point near the bottom of said second distillation column.

Figure 2:
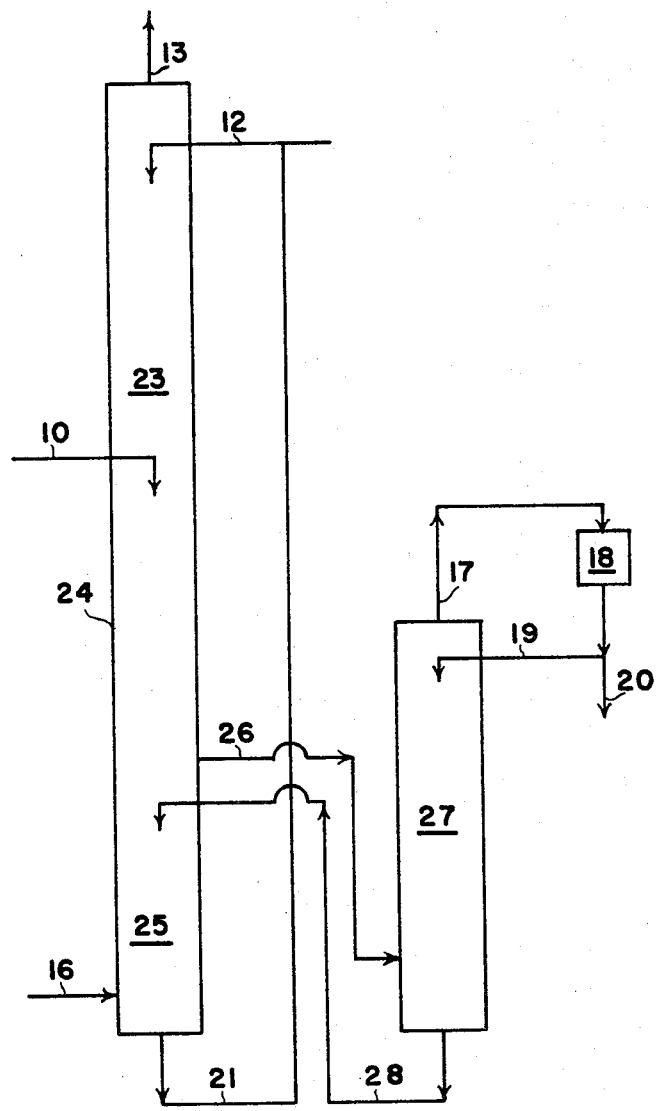
Figure 3:
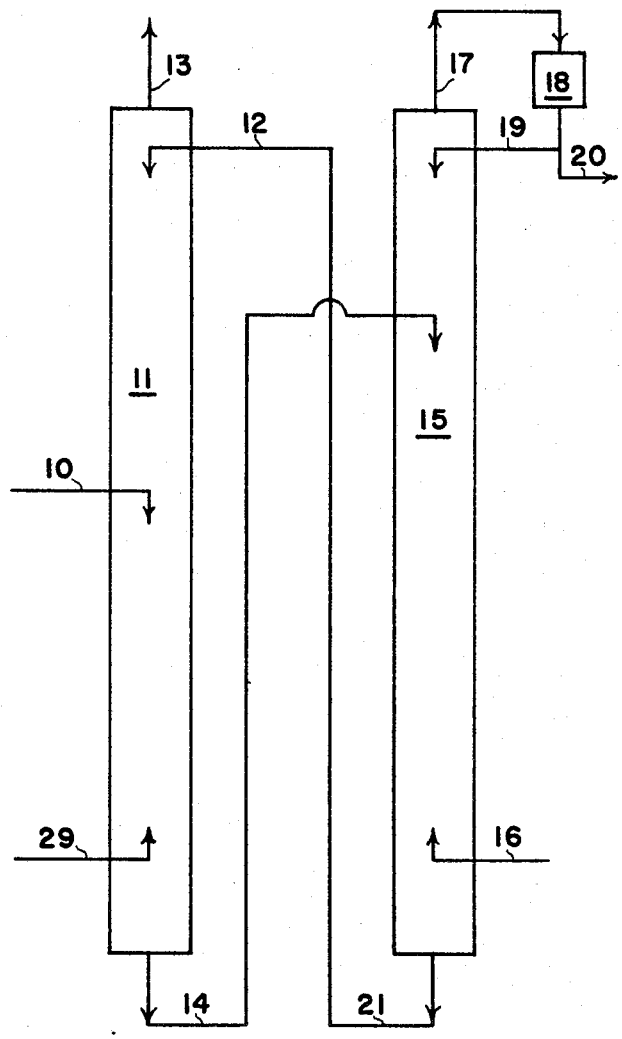

The process and apparatus of the present invention is further described and illustrated by reference to the accompanying drawings. FIGURE 1 of the drawings is a schematic drawing of an embodiment of the present invention which depicts, in simplified form, an illustrative arrangement of equipment for carrying out the process of the present invention. FIGURE 2 depicts another illustrative arrangement of equipment for carrying out the present invention. FIGURE 3 depicts a conventional arrangement of equipment for purifying crude unsaturated nitriles by extractive distillation with water and for recovering and re-using the solvent water. For simplicity, obvious details such as storage tanks, pumps, meters, instrumentation and the like are omitted.

In each of the drawings, the same reference characters are used throughout to denote like features of the apparatus used in carrying out the process of the present invention as well as that used in carrying out the conventional process illustrated with reference to FIGURE 3.

For purposes of more clearly illustrating the present invention, the drawings will be described with respect to the purification of a crude acrylonitrile stream obtained by reaction of ammonia and propylene and which previously has been subjected to a water absorption to absorb the acrylonitrile and water soluble impurities from unreacted hydrocarbons, carbon monoxide, carbon dioxide and nitrogen. Such crude acrylonitrile stream contains 90 to 95% by weight of water and contains acetonitrile, a water miscible impurity, in a mole ratio to the acrylonitrile of about 1 to 7.

Referring first to FIGURE 1, the above-described crude process stream is introduced by means of inlet line 10 into an extractive distillation column 11 intermediate the ends of said column 11. The extractive distillation column will usually have no less than 50 trays and preferably, will have 60 to 100 trays. Inlet line 10 will most often intersect extractive distillation column 11 at a point above or just slightly above, within 5 trays, of the mid-point of said column 11. Simultaneously with the introduction of the impure acrylonitrile, solvent water is introduced into extractive distillation column 11 at a point above inlet line 10 by means of solvent entry line 12. The amount of solvent water introduced by line 12 preferably is 6 to 20 times by weight the amount of olefinically unsaturated nitrile in the process stream. As shown in the drawing, solvent entry line 12 usually opens into extractive distillation column 11 near the top of the column. Preferably, at least 20 to 30 trays separate inlet line 10 and solvent entry line 12.

Within extractive distillation column 11, acrylonitrile vapors pass upward through the column and contact descending liquid water which scrubs the acetonitrile and other water-miscible impurities from the acrylonitrile. Purified acrylonitrile then passes overhead from column 11 through a first outlet line 13. Optionally, depending upon the particular circumstances, a portion of the acrylonitrile overhead which usually contains significant quantities of water, may be returned to column 11 as reflux. On cooling of the overhead, the acrylonitrile and water will separate into separate phases and if desired, the water phase may be returned to extractive distillation column 11.

As acrylonitrile vapors pass up through extractive distillation column 11, water containing absorbed acetonitrile and other impurities pass downward through column 11 and the rich solvent water is then removed from the bottom of column 11 and transferred by means of a second outlet line 14 into solvent stripping column 15. Solvent stripping column 15 usually contains no less than 25 trays and preferably 40 to 60 trays. The rich solvent water is introduced into column 15 above the mid-point of the column. Preferably, the rich solvent water is introduced into column 15 at a point no less than ¼ the distance in trays from the mid-point of the column to the top of the column and no more than ¾ this distance. For example, in an 80 tray column, the rich solvent would preferably be introduced into the column between the 50th and 70th tray from the bottom of the column.

Heat for stripping absorbed water-miscible impurities from the water is supplied to column 15 near the bottom of said column 15 by means of line 16. Usually, the heat is supplied by means of steam which is heat exchanged with the water and water-miscible impurities in column 15 either by indirect means or by means of direct injection into the column. The present invention is not, however, to be limited to steam as a means of supplying heat to column 15 since any convenient form of heat input may be used such as electrical heating means, indirect or direct heat exchange with materials other than steam, etc. Steam is preferred primarily because of its availability, relative ease of handling and comparative low cost. The amount of heat supplied to column 15 by means of line 16 is in at least 5% excess, preferably 10%, over the average normal requirement for the desired separation of water and water-miscible impurities in stripping column 15. For example, if 40,000 B.t.u. of heat is the average normal requirement of heat per given unit of time to effect a separation, then in accordance with the present invention 42,000 B.t.u. of heat would be supplied to column 15 as a minimum.

Within solvent stripping column 15, lean water is concentrated in the bottom of the column while a mixture of water and water-miscible impurities exists within the remainder of the column with the concentration of the water-miscible impurity increasing toward the top of the column. The water-miscible impurity and some water are taken overhead from column 15 by means of outlet line 17 and passed into condenser 18. From condenser 18, a portion of the water-miscible impurity and water is returned to column 15 by line 19 as reflux while the remainder is passed to other disposition by line 20. Lean water is removed from the bottom of column 15 by outlet line 21 through which it is recycled to solved entry line 12.

Heat is supplied to extractive distillation column 11 by means of line 22 which intersects solvent stripping column 15 at a point above the point of entry of rich solvent into column 15 through line 14. Through line 22, a portion of the hot vapors comprised of water and water-miscible impurities is withdrawn from column 15 and introduced into extractive distillation column 11 at a point below the point at which inlet line 10 intersects extractive distillation column 11, preferably within 5 trays of the bottom of column 11. The hot vapors withdrawn from column 15 and introduced into extractive distillation column 11 by line 22, are of a quantity sufficient to cause the acrylonitrile to be forced up the column, but not enough to cause the water-miscible impurities to also be forced up the column.

To describe the present invention in another embodiment, reference is made to FIGURE 2. With reference to FIGURE 2, an impure acrylonitrile stream such as that described with reference to FIGURE 1 is introduced by means of inlet line 10 into an extractive distillation zone or section 23 of column 24. The extractive distillation zone 23 usually contains no less than 50 trays and inlet line 10 connects therewith at a point intermediate the ends of extractive distillation zone 22, most often intersecting at or slightly above the mid-point of said zone 23. Extractive distillation zone 23 fulfills the purpose and objects of extractive distillation coulmn 11 described with reference to FIGURE 1 and is substantially similar thereto both in construction and operation. As with extractive distillation column 11 of FIGURE 1, a solvent entry line 12 introduces solvent water into extractive distillation zone 23 above the point at which inlet line 10 introduces the impure acrylonitrile. From the top of extractive distillation zone 23, purified acrylonitrile and water pass overhead by means of line 13 as in FIGURE 1.

Water-containing absorbed water-miscible impurities pass down through column 24 and extractive distillation zone 23 and into solvent stripping section 25. In the embodiment of the present invention described in FIGURE 2, the function of solvent stripping column 15 of FIGURE 1 is fulfilled by means of solvent stripping section 25 and enriching column 27, the two of which make up the solvent stripping zone. Solvent stripping section 25 usually contains no less than 25 trays or more than 80 trays and is substantially the same in function as that portion of column 15 of FIGURE 1 below the point at which outlet line 22 of FIGURE 1 intersects said column 15. Heat is supplied to solvent stripping section 25 by means of line 16 in the manner described above with reference to FIGURE 1. A portion of the vapors within solvent stripping section 25 pass from column 24 at a point near the top of solvent stripping section 25 by means of line 26 and into an enriching section 27 below the mid-point of said section 27. Preferably, enriching section 27 has 10 to 15 trays and line 26 intersects said section 27 at or near the bottom. In enriching section 27, water-miscible impurities and some water are taken overhead by means of line 17, cooled and condensed in condenser 18 and a portion of the condensed material returned as reflux to enriching section 27 by means of line 19. The remainder of condensed material is passed from condenser 18 to its subsequent disposition by means of line 20.

Water containing substantially reduced amounts of the absorbed water-miscible impurity is taken from the bottom of enriching section 27 by means of line 28 and introduced into solvent stripping section 25 of column 24 at a point below that at which vapors are taken from said section 25 by means of line 26. Lean solvent water is removed from the bottom of solvent stripping section 25 by means of line 21 through which the lean water is recycled to solvent entry line 12. The hot vapors passing from the top of solvent stripping section 25 provide the heat necessary to operate extractive distillation zone 23 to purify the crude acrylonitrile.

To illustrate the differences in the present invention and the conventional means of purifying an impure olefinically unsaturated nitrile, FIGURE 3 is presented. FIGURE 3 shows the conventional means of purifying an impure olefinically unsaturated nitrile by extractive distillation with water and the subsequent recovery and and re-use of the solvent water. With reference to FIGURE 3, an impure acrylonitrile stream such as that described with reference to FIGURE 1 is introduced by inlet line 10 into an extractive distillation column 11 of at least 50 trays, the point of entry of line 10 being substantially the same as shown in FIGURE 1. Purified acrylonitrile and water are taken overhead from extractive distillation column 11 by means of line 13 while rich solvent water is removed from the bottom of column 11 by means of line 14 through which it is introduced into solvent stripping column 15, containing at least 25 trays. In solvent stripping column 15, water-miscible impurities are stripped from the rich solvent water and along with relatively large amounts of water, are removed overhead through line 17. This overhead is then condensed in condenser 18 and a portion returned to column 15 as reflux by means of line 19 while the remainder is passed to its future disposition by means of line 20. Lean solvent water is removed from the bottom of column 15 and returned as recycle to solvent inlet line 12 by means of line 21. In this conventional operation, heat is introduced into column 15 near its bottom by means of line 16 and heat is introduced into column 11 by means of line 29. The means of introducing heat into column 11 is or many be the same as that used for column 15. A primary difference between the conventional process of FIGURE 3 and the process of the present invention as shown in FIGURE 1 is in the requirement of heat addition from an external source to each of column 11 and 15 in FIGURE 3 as opposed to addition of external heat to only column 15 in FIGURE 1. In addition, the conventional process of FIGURE 3 lacks the means of withdrawing hot vapor from column 15 and recycling it to column 11 as described with reference to FIGURE 1, the means in FIGURE 1 being line 22.

To specifically illustrate the present invention and the advantages which obtain therefrom, two extractive distillation runs with recovery and re-use of the solvent water were made. In one of the extractive distillation runs, an arrangement of equipment in accordance with the present invention such as that shown in FIGURE 1 was used while in the other a conventional arrangement of equipment such as shown in FIGURE 3 was used. In each of the runs, both the extractive distillation and solvent stripping columns had 70 trays. An impure acrylonitrile stream consisting of 7.5% by weight acrylonitrile, 1.3% by weight acetonitrile, 1.3% by weight HCN and 89.9% by weight water was introduced into each of the extractive distillation columns at about the 40th tray from the bottom and at a temperature of about 180° F. In the conventional extractive distillation, heat was supplied to the extractive distillation column below the first tray in the form of 298° F. steam and at a rate of 4030 pounds of steam per hour. The steam was introduced directly into the bottom of the extractive distillation column. No steam was used to heat the other extractive distillation column operated in accordance with the present invention. In both extractive distillation runs, a mixture of acrylonitrile and water of substantially the same composition was taken overhead from the extractive distillation column. Also, in both extractive distillation runs rich solvent water was taken from the bottom of the extractive distillation column and introduced into a solvent stripping column at about the 60th tray from the bottom. The temperature at which the rich solvent water was introduced into the solvent stripping column in the conventional arrangement was 228° F. When using the equipment arrangement of the present invention, the temperature was 219° F. Lean solvent water was recycled from the bottom of the solvent stripping column to near the top of the extractive distillation column in both extractive distillation runs. In the extractive distillation carried out in accordance with the present invention, hot vapor was taken from the 60th tray of the solvent stripping column and returned to the extractive distillation column below the first tray. Heat was supplied to the solvent stripping column by means of direct injection of 298° F. steam in both extractive distillation runs. However, in the extractive distillation run carried out in accordance with the present invention, the steam was introduced into the solvent stripping column at a rate of 6500 pounds per hour while in the extractive distillation run carried out by conventional means as shown in FIGURE 3, steam was introduced at a rate of 5700 pounds per hour. Thus, in the extractive distillation run carried out in accordance with the present invention, the 6500 lbs./hr. of steam represents the total hourly heat added to the entire system while in the conventional system 4030 plus 5700 or 9730 lbs./hr. of steam was required to accomplish substantially the same function. The present invention resulted in approximately 33% saving in steam or external heat.

In carrying out the process of the present invention, temperatures within the range of 170 to 240° F. are employed in the extractive distillation column. Preferably, when the crude olefinically unsaturated nitrile is acrylonitrile, temperatures of 180 to 230° F. are used in the extractive distillation column. Within these ranges, higher temperatures are usually found toward the bottom of the extractive distillation column while lower temperatures are found at the top of the column. In a particularly useful mode of practicing the present invention, the temperature at the bottom of the column is most often within the range of 210 to 230° F. with the temperature at the top of the column being 30 to 70° F. less than that at the bottom.

The temperatures within the solvent stripper column genereally are within the range of 120 to 325° F., preferably 190 to 250° F. Again, the higher temperatures within these ranges are found toward the bottom of the column with lower temperatures being found near the top of the column. Temperatures near the bottom of the column in the particularly useful mode of practicing the process of the present invention usually are within the range of 240 to 260° F. with the temperatures near the top of the column being 40 to 80° F. less.

Usually the crude impure olefinically unsaturated nitrile is introduced into the extractive distillation column preheated to a temperature of about 160 to 190° F. The solvent water introduced into the top of the extractive distillation column also is at elevated temperatures, usually 140 to 190° F. on entry into the column.

The pressures in the entire system including both the extractive distillation column and the solvent stripping column, are usually at or near atmospheric pressures, i.e., from atmospheric to 10 p.s.i.g. However, both higher and lower pressures may be used such as pressures as low as 400 mm. Hg and lower and as high as 100 p.s.i.g. and higher.

What is claimed is:
1. A process for purifying crude olefinically unsaturated nitriles by extractive distillation in the presence of water with the subsequent recovery and re-use of said water in said extractive distillation process, said process comprising continuously introducing a crude olefinically unsaturated nitrile containing water-miscible impurities into an extractive distillation zone of 60 to 100 trays, said crude nitrile being introduced at a point intermediate the ends of said extractive distillation zone, continuously introducing solvent water into said extractive distillation zone above the point at which said crude nitrile is introduced, continuously withdrawing rich solvent water from the bottom of said extractive distillation zone, said rich solvent water containing said water-miscible impurities, continuously introducing said rich solvent water into a solvent stripping zone of at least 25 trays at a point no less than ¼ the distance from the mid-point of said solvent stripping zone, to the top of said solvent stripping zone, continuously introducing heat into said solvent stripping zone near the bottom of said zone in an amount in excess of at least 5 percent over that normally required in said solvent stripping zone to affect separation of said water-miscible impurities from said water, continuously withdrawing lean solvent water from the bottom of said solvent stripping zone, continuously returning said lean solvent water to said extractive distillation zone as solvent water, continuously withdrawing a portion of the vapors comprising water and said water-miscible impurities from within said solvent stripping zone at a point above the point at which said rich solvent water is introduced into said solvent stripping zone, continuously introducing said vapors into said extractive distillation zone at a point within 5 trays of the bottom of said extractive distillation zone, continuously recovering olefinically unsaturated nitrile substantially purified of said water-miscible impurities from the top of said extractive distillation zone and continuously recovering water and said water-miscible impurities from the top of said solvent stripping zone, the concentration of said water-miscible impurities in the overhead being substantially greater than in said rich solvent water.

2. The process of claim 1 wherein the amount of heat introduced into said solvent stripping zone is at least 10 percent over that normally required to affect separation of said water-miscible impurities from said water.

3. The process of claim 1 wherein the amount of solvent water introduced into said extractive distillation zone is 6 to 20 times by weight the amount of said olefinically unsaturated nitriles in said crude nitrile stream.

4. The process of claim 1 wherein at least 20 to 30 trays separate the point at which said crude nitrile is introduced into said extractive distillation zone and the point at which solvent water is introduced into said extractive distillation zone.

5. An apparatus for the purification of olefinically unsaturated nitriles by extractive distillation in the presence of water with the subsequent recovery and re-use of said water in said extractive distillation process, said apparatus comprising
(A) a first distillation column of at least 60 to 100 trays,
(B) a second distillation column of at least 25 trays,
(C) feed inlet means in open communication with said first distillation column at a point intermediate the ends of said first distillation column, said inlet means also in open communication with the source of an impure olefinically unsaturated nitrile feed,
(D) a first outlet means at the top of said first distillation column for removing overhead distillate from said first distillation column,
(E) a second outlet means at the bottom of said first distillation column, said second outlet means being in open communication with said second distillation column at a point no less than ¼ the distance from the mid-point of said second distillation column, to the top of said distillation column,
(F) a first outlet means from said second distillation column at the bottom of said second distillation column, said first outlet means in open communication with said first distillation column at a point above said feed inlet means of said first distillation column,
(G) a second outlet means from said second distillation column located at a point above that at which said second outlet means from said first distillation column is in open communication with said second distillation column, said second outlet means from said second distillation column being in open communication with said first distillation column at a point within 5 trays of the bottom of said first distillation column, (H) a third outlet means from said second distillation column at the top of said second distillation column for removing overhead distillate from said second distillation column, and (I) means for introducing heat into said second distillation column at a point near the bottom of said second distillation column.

6. The apparatus of claim 5 wherein said feed inlet means in said first distillation column intersects said first distillation column within 5 trays above the mid-point of said first distillation column and said first outlet means from said second distillation column is in open communication with said first distillation column at a point at least 20 to 30 trays above said feed inlet means.

7. An apparatus for the purification of olefinically unsaturated nitriles by extractive distillation in the presence of water with the subsequent recovery and reuse of said water in said extractive distillation process, said apparatus comprising:

(A) a first distillation column having an upper section comprising an extractive distillation zone of 60 to 100 trays and a lower section comprising a solvent stripping zone of at least 25 trays, the top of said lower section being in open communication with the bottom of said upper section, (B) a second distillation column comprising an enriching section of at least 10 trays, the number of trays in said second distillation column being no greater than ⅜ of the total of the trays in said lower section of said first distillation column plus the number of trays in said second distillation column, said enriching section being connected by flow means with said solvent stripping zone such that said enriching section and said solvent stripping zone function as a single distillation column, (C) feed inlet means in open communication with said first distillation column at a point intermediate the ends of said upper section of said first distillation column, said inlet means also in open communication with the source of an impure olefinically unsaturated nitrile feed, (D) solvent inlet means in open communication with said first distillation column at a point above said feed inlet means, (E) a first outlet means at the top of said first distillation column for removing overhead distillate from said first distillation column, (F) a second outlet means at the bottom of said first distillation column in open communication with said solvent inlet means, (G) a first outlet means from said second distillation column at the top thereof for removing overhead distillate from said second distillation column, and (H) means for introducing heat into said solvent stripping zone at a point near the bottom of said solvent stripping zone.

References Cited

UNITED STATES PATENTS

| | | | |
|---|---|---|---|
| 2,672,434 | 3/1954 | MacFarlane | 202—154 |
| 2,672,435 | 3/1954 | Shoptaw | 202—154 |
| 2,987,451 | 6/1961 | Sennewald et al. | 260—465.9 |
| 3,210,399 | 10/1965 | Krzemicki | 260—465.9 |
| 3,264,197 | 8/1966 | Schonbeck et al. | 203—85 |
| 3,265,594 | 8/1966 | De Jean et al. | 203—96 |

WILBUR L. BASCOMB, JR, *Primary Examiner.*